Nov. 11, 1924.

A. E. CARLSON

JACK

Filed April 28, 1923

1,514,893

INVENTOR.

Anthony E. Carlson,

BY

Robt. D. Pearson

ATTORNEY.

Patented Nov. 11, 1924.

1,514,893

UNITED STATES PATENT OFFICE.

ANTHONY E. CARLSON, OF LOS ANGELES, CALIFORNIA.

JACK.

Application filed April 28, 1923. Serial No. 635,275.

*To all whom it may concern:*

Be it known that I, ANTHONY E. CARLSON, a citizen of the United States, residing at Los Angeles, in the county of Los Angeles and State of California, have invented certain new and useful Improvements in Jacks, of which the following is a specification.

My invention relates to lifting jacks, and the objects are first, to provide a jack that may be pushed under an object to be lifted when close to the floor or other supports; second, to provide a spreading apparatus that may be wedged between two objects to be pushed apart; third, to provide a jack that may be driven under an automobile when lying close to the floor line, with broken or mired wheels; fourth, to construct a jack that possesses advantages in its simplicity of construction and operation.

With the foregoing objects in view, the invention resides in the combination of details and construction hereinafter described and claimed.

I attain these objects by the mechanism illustrated in the accompanying drawings, in which.

Figure 4:
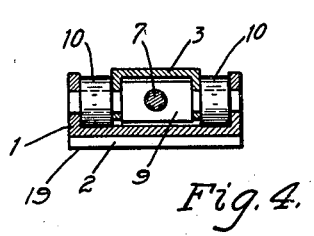
Figure 4 represents a sectional view on line 4—4 of Figure 1.

Referring to the drawings in which like characters of reference designate similar parts, the base 1 comprises the body portion of the jack, with longitudinal spaces 25 therein, a wedge 6 is formed on the front-end portion of the base 1, and a set of bearings 16, 17 and 18 are positioned in a longitudinal line with one another through the length of the said base 1, adjacent to the inner portion of the wedge 6, the central portion of the base 1 and the rear portion of the base 1, respectively, two sets of ways 23 are positioned in the front-side and rear-side portions of the said base 1, between the bearings 16—17 and 17—18, respectively, a pair of trunnions 9 are operatively positioned in the said ways 23, the central portion of the said trunnions 9 operatively receive the threaded portions 24 on the screw 7, as shown in Figure 4, the said threaded portions 24 on the screw 7 are formed between the bearings 16—17 and 17—18, respectively, and a shank 8 is formed on the outer-end portion of the said screw 7, adjacent to the outer-rear face of the bearing 18, and the said screw 7 is in turn operatively positioned in the said bearings 16, 17 and 18, and the collars 26 are secured on the said screw 7 adjacent to the front and rear sides of the said bearing 17. The lower-end portions of the arms 3 and the rollers 10 are operatively positioned on the trunnions 9 between the said ways 23, and the said rollers 10 are operatively positioned on the lower surface of the spaces 25. The upper-end portions of the arms 3 and the lower portion of the head 4 are operatively secured together by a set of pins 11, the ears 27 are integral with the said head 4 and project downwardly a distance, the slots 13 are formed vertically in the said ears 27, and a pin 15 is operatively positioned in the said slots 13 and the lower-inner end portions of the links 12, and the upper-end portions of the said links 12 are operatively secured to the upper-inner end portions of the said arms 3 by the pins 14, at positions to clear the lower-end portions of the head 4 and the outer-end portions of the ears 27, when the jack is in its raised or lowered positions. The block 5 is seated in the top portion of the head 4, and the subbase 2 is swivelly positioned on a pin 20 within the bottom face of the base 1, and it will also be noted that the surfaces 19 beneath the said base 1 and subbase 2 are in a longitudinal line with one another, and that the surfaces 21, 22 and 28 over the said wedge 6, arms 3 and head 4 respectively, are in an angular line with one another.

Figure 3:
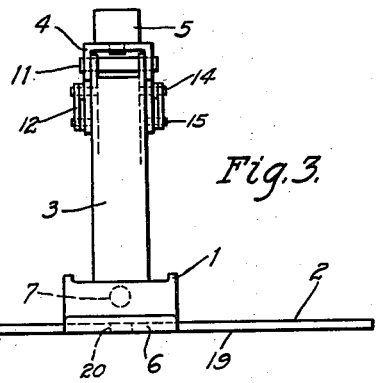
Figure 3 represents an end view of Figure 1.
Figure 5:
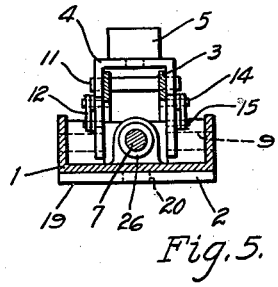
Figure 5 represents a sectional view on line 5—5 of Figure 1.
Figure 2:
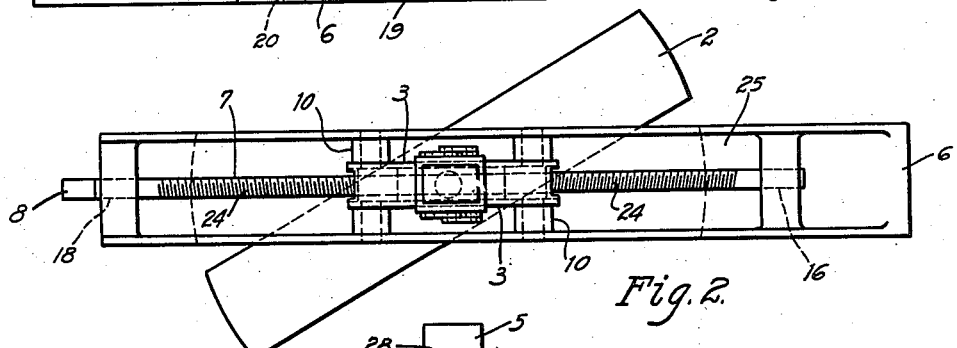
Figure 2 represents a plan view of Figure 1.
Figure 1:
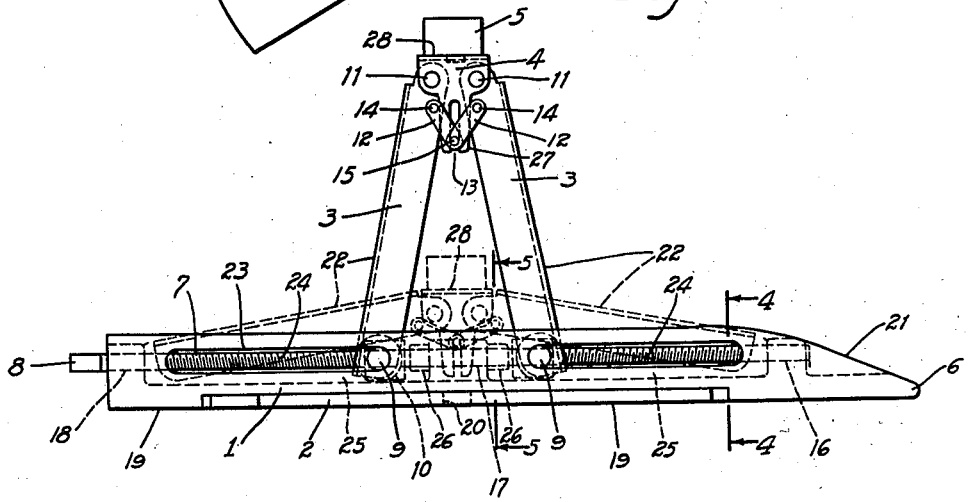
Figure 1 represents a side elevation of my jack in an extended position, and in profile in a lowered position.

The operation of my jack is accomplished by first pushing, or driving, the wedge 6 between the parts to be separated, or under the object to be raised, and by continuing to wedge the front end of the arm 3 and base 1, respectively, between the said parts, or under the said object, till the top surface 28 on the head 4 is positioned therebetween, or thereunder, when the said jack is in a lowered position, the spreading or raising operation is then begun by turning the shank 8, and screw 7, to shift the trunnions 9 together on the right-hand and left-hand threaded portions 24 on the said screw 7, and thus forces the lower ends of the arms 3 together on the said trunnions 9 from a folded position to a raised position, as shown in Figure 1 in profile and full view, respectively, and the said parts, or objects, on the head 4 are forced away from the base 1 by the swinging action of the arms, together at their bottom ends and by raising on the pins 11 within the said head 4. When the said arms 3 are being moved by the screw 7 as hereinbefore described, the rollers 10 bear on the bottom face of the spaces 25 between the ways 23 and the outer faces of the arms 3, to carry the thrust of the arms 3 and the load on the head 4. The collars 26 hold the bearings 16, 17 and 18 on the screw 7 in their longitudinal position, and the links 12 in turn hold the top surface 28 on the said head 4, and the bottom surface 19 under the base 1 in parallel positions with one another, by the pivoting action of the said link 12 on the pins 14 and by pivoting together on the pin 15, and the said pin 15 in turn slides vertically in the slot 13 when the said jack is being raised or lowered, as hereinbefore described. When it is desired to increase the area of the foundation for the said jack the subbase 2 may be turned on the pin 20, to swing the ends from under the base 1, as shown in Figures 2 and 3, and when the jack is to be used for a still higher lift, the block 5 may be employed by being secured on the surface 28, over the said head 4.

Having thus described my invention what I claim is:

1. A jack of the class described, the combination of an elongated base having a bottom bearing face, a wedge means on the upper front end of the said elongated base, a pair of arms having their lower ends operatively positioned in the said base, a head operatively connected to the upper ends of the said arms, an elevating means operatively positioned in the said base, adapted to move the lower ends of the said arms together or apart, a control means connected between the upper end portions of the said arms and the said head, adapted to hold the top face of the said head parallel with the bottom face of the said base, as set forth said wedge means, arms and head being arranged to rest in wedging alinement with each other when said arms and head are in their lower position.

2. A jack of the class described, the combination of an elongated base, a swinging subbase, adapted to swing out from the said base, or fold flush into the bottom face of the said elongated base, a pair of arms having their lower ends operatively positioned in the said base, adapted to move the lower ends of the said arms together or apart, a control means connected between the upper end portions of the said arms and the said head, adapted to hold the top face of the said head parallel with the bottom face of the said base, a wedge means on the front end of the said elongated base, as set forth.

In testimony whereof I affix my signature.

ANTHONY E. CARLSON.